E. C. SCHWARTZ.
STREET INDICATOR.
APPLICATION FILED OCT. 20, 1908.

955,215.

Patented Apr. 19, 1910.

Witnesses
W. A. Grondahl
Gryff Perrott

Inventor
Edward C. Schwartz
by Attorney
Thomas Bilyeu

UNITED STATES PATENT OFFICE.

EDWARD C. SCHWARTZ, OF PORTLAND, OREGON.

STREET-INDICATOR.

955,215.  Specification of Letters Patent. Patented Apr. 19, 1910.

Application filed October 20, 1908. Serial No. 458,654.

*To all whom it may concern:*

Be it known that I, EDWARD C. SCHWARTZ, a citizen of the United States, residing at Portland, county of Multnomah, and State of Oregon, have invented a new and useful Street-Indicator for Use on Passenger-Vehicles of Any and Every Description, the following being a specification of the same.

This device has been developed for use particularly upon electric railway passenger cars to indicate automatically the next street to be crossed, or station to be passed. It being in view of the passengers where it may be read by them, therefore, they may know when their place of leaving the car has been reached merely by watching the indicator. I attain this object by the mechanism illustrated in the accompanying drawings, in which—

Figure 1:
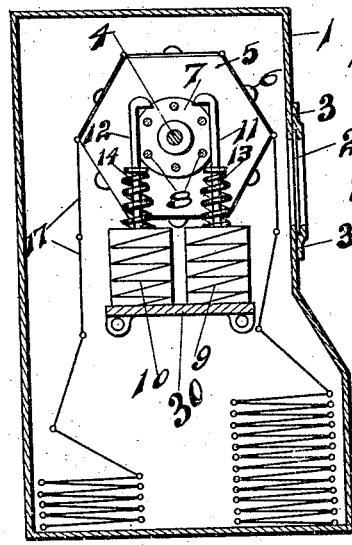
Figure 2:
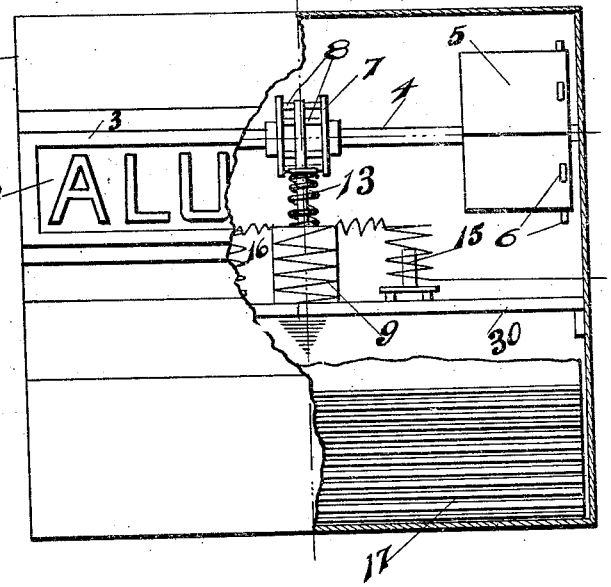
Figure 3:
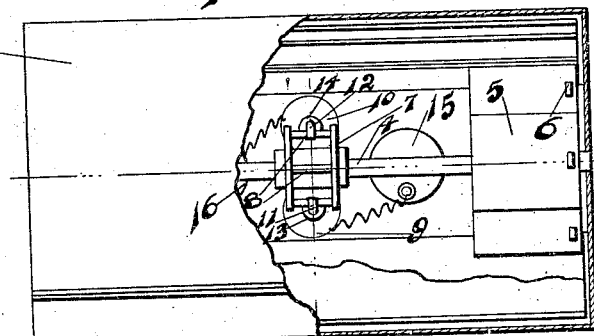
Figure 4:
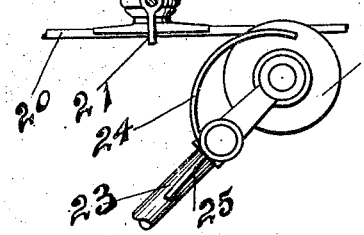
Figure 5:
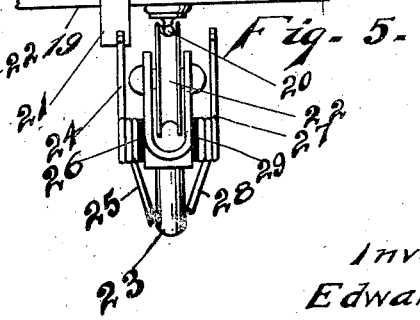

Figure 1 is a partial cross section of the indicator showing the different parts in place and their proper relation with each other. Fig. 2 is a partial front view of the same; a portion of the front of the case has been removed to better illustrate the workings of the different parts. Fig. 3 is a top view of the indicator having a portion of the case removed to also show the mechanism for operating. Fig. 4 is a side elevation of the trolley wire, the trolley wheel in place thereon, and also showing the method of making the contact for obtaining the electric current for operating the indicator. Fig. 5 is an end view of the same.

Similar numerals refer to similar parts throughout the several views.

The numeral 1 indicates the case into which the operating mechanism is placed, and 2 indicates a transparent substance that is placed over an opening in the front of the case and through which the street indicator may be seen. Said transparent part may be held in place by the plate 3. A transverse shaft 4 passes through or across the inner portion of the case 1 parallel with the sides thereof. Secured to the shaft 4 are hexagonal pulleys 5, one near each end of the shaft. In the center of each face of said pulleys and near its outer end is a tooth 6, said teeth being for the purpose of engaging in openings in the strips 17, described below. Secured to the shaft 4 between the pulleys 5 is a pinion 7 having as many teeth as the pulleys have faces, and the pinion is so placed upon the shaft that a plane passing through the center of a face of either pulley will pass through one of the teeth of the pinion and the center of the shaft 4.

9 and 10 indicate a pair of solenoids having plungers 11 and 12, respectively. Said plungers coöperate with compression springs 13 and 14, respectively. When the current passes through the solenoid 9 its magnetic influence has a tendency to pull the plunger 11 downwardly, which being bent into a hook or at right angles at its upper end engages with a tooth 8 of the pinion 7, whereby said pinion is caused to rotate one-sixth of its entire rotation, and, therefore, all the parts that are secured thereto are likewise caused to rotate to a like extent. When the solenoid 9 is deënergized the spring 13 having been put under compression by the downward movement of the plunger 11 causes said plunger to return to its original position. When it is desired to rotate the shaft 4 in the opposite direction the solenoid 10 is energized, which acting upon the plunger 12 engages the teeth of the pinion 7 on the opposite side from that just described.

15 and 16 indicate resistance members through which the current passes before entering the solenoids, to which they are respectively connected. The resistance members are for the purpose of receiving the initial current and relieving the solenoids 9 and 10 from the shock which would result if the relays or their equivalents were not used.

The names of the streets or the stations are printed or otherwise placed upon the individual strips 17, the width of which is somewhat greater than the length of one of the faces of the hexagonal pulleys over which they pass and come in contact.

An insulator 18 is held in place by means of a guy wire 19, and to the insulator the trolley wire 20 is indirectly fastened.

21 indicates a contact tip secured to the guy wire 19.

The trolley wheel 22 is carried by the usual pole 23, and is provided upon opposite sides with a pair of contact springs 24 and 27, the contact tip 21 being in the path of one or the other of said springs, depending upon the direction in which the car is running. The contact springs have electrical connections through wires 25 and 28, respectively, with the aforesaid magnets and relays. Suitable insulation 26 and 29 may be placed between the trolley head and the contact springs.

Having thus described the invention, what is claimed as new is:

In a street indicator, the combination of a casing, a shaft journaled in the casing, a pair of pulleys secured on the opposite ends of the shaft within the casing, a pinion secured on the shaft between the pulleys, a pair of solenoids having hook shaped plungers arranged on opposite sides of the pinion, the hooks thereof being normally spaced above the pinion teeth, compression springs tending to maintain the plungers in normal position, a pair of resistance members associated with the solenoids, respectively; a series of indicating strips connected together and operating over said pulleys, a trolley head, means associated with the trolley head to make a circuit through said relays, and solenoids to successively present said indicating strips to view.

EDWARD C. SCHWARTZ.

Witnesses:
W. A. GRÖNDAHL,
GUY H. PERROTT.